United States Patent [19]

Shin et al.

[11] Patent Number: 5,084,289

[45] Date of Patent: Jan. 28, 1992

[54] METHOD FOR THE INHIBITION OF OXIDATION OF EDIBLE OILS UTILIZING A FAT SOLUBLE ANTI-OXIDANT AND A WATER SOLUBLE ANTI-OXDANT IN A REVERSE MICELLE SYSTEM

[75] Inventors: Hyun-Kyung Shin; Dae-Seok Han; Ock-Sook Yi, all of Seoul, Rep. of Korea

[73] Assignee: Korea Food Research Institute, Rep. of Korea

[21] Appl. No.: 467,135

[22] Filed: Jan. 18, 1990

[30] Foreign Application Priority Data

Feb. 1, 1989 [KR] Rep. of Korea ............... 1155/1989

[51] Int. Cl.$^5$ ............................................. A23D 9/06
[52] U.S. Cl. ................... 426/330.6; 426/541; 424/439; 514/844
[58] Field of Search ................. 426/541, 542, 330.6, 426/604, 601; 424/439; 514/844

[56] References Cited

U.S. PATENT DOCUMENTS

| | | | |
|---|---|---|---|
| 2,708,628 | 5/1955 | Bauernfeind | 426/73 |
| 3,833,743 | 9/1974 | Morse | 426/72 |
| 4,115,597 | 9/1978 | Pellar | 426/541 |
| 4,316,917 | 2/1982 | Antoshkiw | 426/73 |
| 4,590,086 | 5/1986 | Takahashi | 252/312 |
| 4,608,347 | 8/1986 | Bernstam | 252/351 |
| 4,619,795 | 10/1986 | Cohen | 424/450 |
| 4,913,921 | 4/1990 | Schroeder | 426/541 |
| 4,925,681 | 5/1990 | Mai | 426/542 |
| 5,015,483 | 5/1991 | Haynes | 426/73 |

FOREIGN PATENT DOCUMENTS

| | | | |
|---|---|---|---|
| 708130 | 4/1965 | Canada | 426/73 |
| 51-79746 | 7/1976 | Japan | 426/541 |
| 56-29967 | 3/1981 | Japan | 426/541 |

OTHER PUBLICATIONS

Swern 1979 Bailey's Industrial Oil and Fat Products vol. 1, Fourth Edition John Wiley & Sons New York pp. 72-77.
"Inhibition of Oxidation of Methyl Linoleate in Solution by Vitamin E and Vitamin C", Niki, E., T. Saito, A. Kawakami and Y. Kamiya, *J. Biol. Chem.*, 269(7), 4177 (1984).
"Preservatives: Antioxidants", Dziezak, J. D., *Food Technol.* 40 (9), 94 (1986).
"Antioxidants-Quality Protectors", *Food Processing*, Feb., 37 (1985).
"Phospholipids as Antioxidant Synergists for Tocopherols in the Autoxication of Edible Oils", Hudson, B. J. F., M. Ghavami, Lebensm.-Wiss. u.-Technol., 17, 191 (1984).
"The Radical Answer", Gregory, D., *Food*, Jun. 18 (1984).

*Primary Examiner*—Carolyn Paden
*Attorney, Agent, or Firm*—Browning, Bushman, Anderson & Brookhart

[57] ABSTRACT

A method for inhibiting the oxidation of edible oils and fats by forming a reverse micelle by admixing a mixture of an aqueous solution containing a water-soluble antioxidant with a surfactant and said oils or fats.

20 Claims, 1 Drawing Sheet

METHOD FOR THE INHIBITION OF OXIDATION OF EDIBLE OILS UTILIZING A FAT SOLUBLE ANTI-OXIDANT AND A WATER SOLUBLE ANTI-OXDANT IN A REVERSE MICELLE SYSTEM

BACKGROUND OF THE INVENTION

1. Field of the Invention

This invention relates to a method for the inhibition of the oxidation of edible oils and for improving the storage stability of oils by dissolving water-soluble natural antioxidants in them.

2. Description of the Prior Art

Oxidative deterioration of products which occurs by the oxidation of the oils and fats contained in these products cannot be prevented by conventional, prior art methods. The oxidative deterioration during the production, process or storage decreases quality and nutritive value of the product. It can also cause other deteriorating effects, such as discoloration, vitamin destruction and polymerization. Therefore, a more effective method for inhibiting oxidation of the products containing oils and fats is necessary.

To overcome this problem, synthetic antioxidants, such as butylated hydroxyanisole, butylated hydroxytoluene, propyl gallate, iso-ascorbic acid, chloro-iso-ascorbic acid, and ascorbyl palmitate have been used. However, there is a tendency for the consumers to prefer natural antioxidants because there is some question as to the safety of the presently used synthetic antioxidants. Although there are various kinds of natural antioxidants, such as tocopherol, plant extracts, gamma-oryzanol and sesamol, few of them are used industrially with satisfaction because of high price, shortage or low antioxidative activity.

Ascorbic acid, Vitamin C, is well known for its physiological effect and widely used as a food additive due to its ability to prevent interacting oxidizable materials with oxygen. It is known that ethylenediaminetetraacetic acid (hereafter abbreviated as EDTA) or disodium ethylenediaminetetraacetic acid (hereafter abbreviated as $Na_2$ EDTA) prevents oils and fats from being oxidized by inactivating metal ions.

Although ascorbic acid and EDTA (or $Na_2$ EDTA) can be used as antioxidants in foods, cosmetics or medicines containing a large amount of water because they are easily dissolved in water, they cannot be used in oils and fats, fatty acids and aliphatic acid alkyl esters because of their low solubility in these media. On the other hand, tocopherol is widely used as a supplement to oils and fats for its physiological effect and also used as an antioxidant for its antioxidative activity.

SUMMARY OF THE INVENTION

When edible oils containing surfactant are stirred after the addition of aqueous ascorbic acid solution, reverse micelles are formed. Reverse micelles are spheroidal aggregates formed by certain surfactants in apolar media. In contrast to normal micelles in water, the apolar head groups of surfactant molecules are directed toward the interior of the aggregate and form a polar core which can solublize water; the lipophilic chains are exposed to the apolar media. When ascorbic acid is solublized in oils via reverse micelles, the oxidative stability of oils can be increased owing to its antioxidative effect.

The present invention provides the method for dissolving all kinds of water-soluble antioxidants in oils in the presence of surfactant and water. This method can be used for the stabilization of edible oils and fats, fatty foods, medicines and cosmetics, by preventing oxidation of oils and fats.

It has been found that when both tocopherol and ascorbic acid are added together in oils and fats, they exert a synergistic effect. It is believed that tocopherol traps the peroxy radical and the resulting chromanoxy radical reacts with ascorbic acid to regenerate tocopherol. However, there is a problem to use these compounds together to improve the oxidative stability of oils and fats, for tocopherol is oil-soluble and ascorbic acid is a water-soluble compound.

To improve the solubility of water-soluble antioxidants, such as ascorbic acid and EDTA in oils and fats, the inventors could accomplish this invention. The objective, characteristic, advantage and availability of the invention is explained more clearly in the following description. This invention could be applied to various oils and fats, fatty foods like mayonnaise and dressing, cosmetics and medicines containing lots of oils and fats. From now on, all of those compounds are abbreviated as oils and fats.

BRIEF DESCRIPTION OF THE DRAWINGS

In FIG. 1, the curves show the changes of the peroxide values with storage time at 30° C.: curve 1 shows the change of the peroxide value of the fish oil containing no antioxidant; curve 2 shows those of the fish oil containing 0.2% rosemary extract; curve 3 shows those of the fish oil containing 0.5% delta-tocopherol: and curve 4 shows those of the fish oil containing 200 ppm ascorbic acid.

In FIG. 2, the curves show the changes of the peroxide values with storage time at 30° C.: curve 1 shows the change of the peroxide value of the fish oil containing no antioxidant: curve 2 shows those of the fish oil containing 200 ppm ascorbic acid which solublized according to the method invented in the present invention: curve 3 shows those of the fish oil containing 200 ppm ascorbic acid and 0.2% rosemary extract; and curve 4 shows those of the fish oil containing 200 ppm ascorbic acid and 0.5% deltatocopherol.

DESCRIPTION OF PREFERRED EMBODIMENTS

Figure 2:
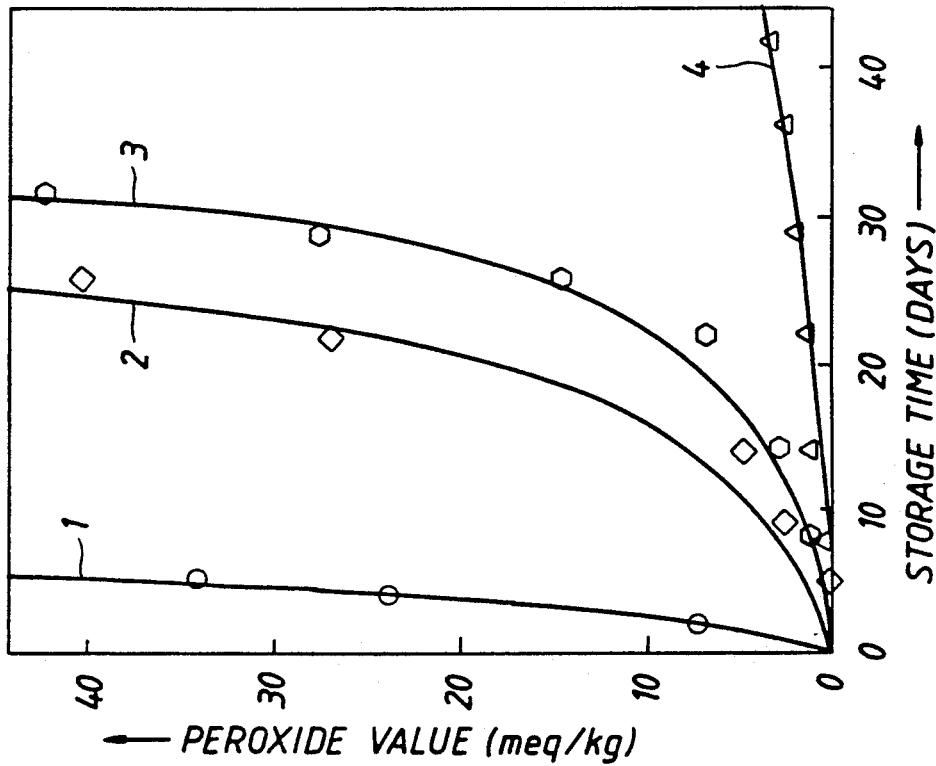
FIGS. 1 and 2 show the inhibiting effect of the natural antioxidants, such as ascorbic acid, rosemary extract, delta-tocopherol, and their mixtures on the oxidation of fish oil.

The terms "oils" and "fats" are used interchangeably herein and are intended to cover edible or non-toxic products formed of or containing these materials, it being understood that such oils or fats are, in and of themselves, generally edible products of nature which are subject to oxidative deterioration.

The surfactant plays an important role in making reverse micelle solutions of oils and fats. In the present invention, the surfactants must have high solubility in oils and fats and high water-solubilizing power. For example, cetyltrimethyl-ammonium bromide, polyethylene glycol 6000, polyoxyethylene ethers of alcohols (Brij 35 marketed by ICI United States, Inc.), Octoxynol, a Triton X-100 marketed by Eastman Kodak Co., U.S.A.: polyoxyethylene derivatives of fatty acid partial esters of sorbitol anhydrides, such as Tween 80 marketed by Japan Kao Co., Japan Aerosol OT ®, a wetting agent, such as diotyl sodium sulfosuccinate marketed by American Cyanamid Co., U.S.A., monoglycerides and phospholipids, etc. can be used. Although Tween 80, monoglycerides, Aerosol OT ® and phospholipids could be used in cosmetics and medicines, only three of them, Tween, monoglyceride and phospholipid, are permitted for food products because of hygienic considerations.

In the present invention, phospholipids, surfactants used for making reverse micelles, could be added to oils and fats at the maximum concentration in terms of their solubility. However, considering the economic aspects and the impurities contained in phospholipids themselves which can act as oxidants, it is preferable to add an amount of 0.1–0.5% concentration on the basis of the weight of the oils and/or fats. The amount of water incorporated to dissolve the water-soluble antioxidant in reverse micelle system has an effect on the oxidation rate of oils and fats. Varying the water content with constant concentrations of surfactant and antioxidant tends to increase the oxidation rate in proportion to the concentration of water in oils and fats. It is desirable to add water in an amount of 0.05–0.5 times the weight of surfactant used in the formation of reverse micelles.

Almost all of the water-soluble antioxidants can be dissolved in reverse micelles by using the present method. Such antioxidants include ascorbic acid, the extracts of spices, such as rosemary and sage and plants, amino acids, such as proline and histidine, and organic acids, such as citric acid, succinic acid and malic acid. In some cases, EDTA or $Na_2$ EDTA can be used as a synergist.

These antioxidants can be added individually or as a mixture. The amount added depends on the kind of substrate oils and fats, their antioxidative activity and the kinds of antioxidants used together If fat-soluble antioxidants and additionally water-soluble antioxidants are added to oils and fats via reverse micelles, a synergistic effect is obtained. For example, adding tocopherol, a fat-soluble antioxidant, to the oils and fats where water-soluble antioxidants, such as ascorbic acid, iso-ascorbic acid and chloro-iso-ascorbic acid are dissolved via reverse micelles, we can obtain an increased effect compared with the case of these antioxidants used individually. If necessary, the water-soluble antioxidants, such as ascorbic acid, iso-ascorbic acid, chloro-iso-ascorbic acid, or organic acid and the fat-soluble antioxidants, such as butylated hydroxyanisole, butylated hydroxytoluene, and propyl gallate can be used together.

The following non-limiting examples illustrate the method of the invention in detail.

EXAMPLE 1

A given amount of dioctyl sodium sulfosuccinate (AOT) shown in Table 1 is dissolved in 100 g of methyl esters of corn oil using a magnetic stirrer. After the AOT dissolved completely in the methyl esters, 0.6–7 ml of aqueous solution containing a different amount of ascorbic acid was added. Upon gentle stirring. the reverse micelles of the methyl esters were formed and the ascorbic acid solution was dispersed in the methyl esters uniformly. The methyl esters containing 400–1440 ppm ascorbic acid were prepared and divided into 10 g samples in a Petri dish, 11.5 cm in diameter and 1 cm deep, and then stored in a dark oven kept at 30° C.

After 27 days of storage, peroxide value was determined as an index of oxidation stability of the methyl esters and the changes of color and the formation of precipitate were also observed as an index of the appearances of the methyl esters.

TABLE 1

| AOT (mM) | Water (%) | Ascorbic Acid (ppm) | Peroxide Value (meq/kg) | Browning | Appearances |
|---|---|---|---|---|---|
| 0 | 0 | 0 | 30.2 | — | T[b] |
| 10 | 0.6 | 400 | 4.0 | — | T |
| 25 | 1.5 | 400 | 0.8 | — | T |
| 50 | 0 | 0 | 31.5 | — | T |
| 50 | 0.9 | 400 | 1.4 | — | P[c] |
| 50 | 1.2 | 400 | 1.2 | — | T |
| 50 | 1.8 | 400 | 1.8 | +[a] | T |
| 50 | 2.5 | 400 | 3.0 | + + | T |
| 50 | 2.5 | 720 | 0.3 | — | P |
| 50 | 2.5 | 960 | 0 | — | P |
| 50 | 2.5 | 1440 | 0 | — | P |
| 50 | 3.5 | 400 | 4.4 | + + | T |
| 50 | 5.3 | 400 | 3.7 | + + + | P |
| 50 | 7.8 | 400 | 6.0 | + + + | P |

[a] The number of + mark indicates the degree of browning.
[b] T indicates that the reverse micelles are maintained transparently during the period of experiment.
[c] P indicates that ascorbic acid is precipitated during the period of experiment.

As shown in Table 1, the peroxide value of the methyl esters of corn oil containing no ascorbic acid was 30.2 (meq/kg) after 27 days of storage. The peroxide value of the sample containing 400 ppm ascorbic acid via reverse micelles was about 0.8–3.0 (meq/kg) depending on the experimental conditions. This result shows that ascorbic acid dissolved in methyl esters of corn oil exerted a remarkable antioxidant effect.

Generally, as the concentration of ascorbic acid in the oil increased, the antioxidant effect increased. But, at a concentration of ascorbic acid reaching to 720 ppm, the appearance of the methyl esters was deteriorated by the formation of precipitates with the lapse of storage time. Thus, it is desirable to add ascorbic acid at a concentration under about 700 ppm.

On the other hand, to see the effect of water content, water was added in methyl esters of corn oil containing 400 ppm ascorbic acid at a different concentration of 0.6–7.8 wt %. When the concentration of water exceeded 2.5wt %, the color of the methyl esters was browned. From this result, it is desirable to add the water at a concentration under 2.5 wt % to the methyl esters of oils.

EXAMPLE 2

0.5 g of soybean lecithin was added to 100 g each of soybean oil, rapeseed oil and rice-bran oil by stirring under a nitrogen stream. After dissolving the lecithin in the oils. 0.05 ml of 40% (w/w) aqueous ascorbic acid solution was added to each oil and stirred until the reverse micelles of oils are formed uniformly. 10 g of each oil sample containing 200 ppm ascorbic acid was put into a Petri dish, 11.5 cm in diameter and 1 cm deep, and stored in a dark oven kept at 60° C. After 14 days of storage, peroxide value was determined as an index of oxidation stability of the oils (method of AOCS Cd 8-53). The results are shown in Table 2.

TABLE 2

|  | Soybean Oil | | Rapeseed Oil | | Rice-bran Oil | |
| --- | --- | --- | --- | --- | --- | --- |
|  | Peroxide Value (meq/kg) | Flavor | Peroxide Value (meq/kg) | Flavor | Peroxide Value (meq/kg) | Flavor |
| No addition (soybean) | 321.1 | +++ [a] | 143.3 | +++ | 85.7 | ++ |
| Lecithin 0.3% + water 0.5% + ascorbic acid 0.02% | 13.7 | — | 32.5 | + | 3.6 | — |

[a] + symbol indicates the strength of rancid off-flavor

As shown in Table 2, the peroxide values (meq/kg) of soybean oil, rapeseed oil and rice-bran oil were 321.1, 143.3 and 85.7, respectively, and all of these oils had strong unpleasant off-flavor.

On the other hand, the peroxide values of soybean oil, rapeseed oil and rice-bran oil containing 200 ppm ascorbic acid solublized via the reverse micelles formed by dissolving 0.3% soybean lecithin and 0.05% water in the oils were determined after 14 days of storage and the peroxide values (meq/kg) obtained were 13.7, 32.5 and 3.6, respectively. Although rapeseed oil had a weak off-flavor, the soybean oil and rice-bran oil did not have any off-flavor. These results show that ascorbic acid added to the oils via reverse micelles exerted a strong antioxidant effect in the oils tested.

EXAMPLE 3

0.2 g of rosemary extract (product of McCormick Co., Japan; sp-10) and 0.5 g of delta-tocopherol are dissolved respectively in 100 g of fish oil, and 10 g of each fish oil sample thus prepared was put into a Petri dish, 11.5 cm in diameter and 1 cm deep, and stored in a dark oven kept at 30° C.

Figure 1:
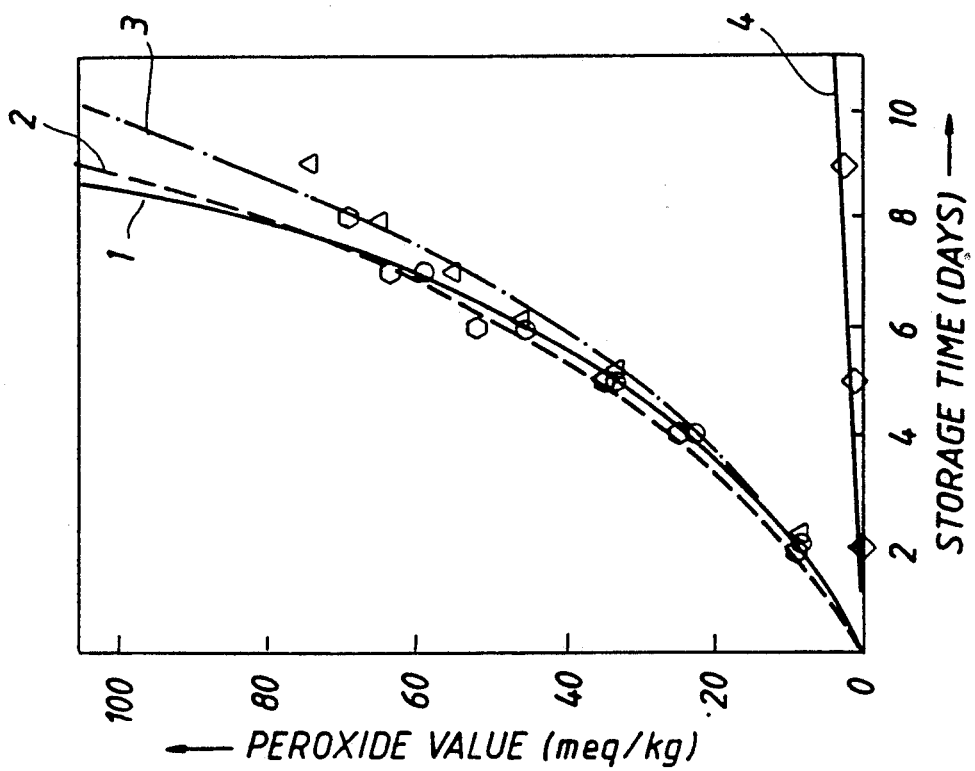

During 10 days, the peroxide values were determined at various intervals. Changes of the values with storage time are shown in FIG. 1. As shown in FIG. 1, ascorbic acid solublized in the oil via the reverse micelles showed a remarkable effect for inhibiting the oxidation of fish oil.

EXAMPLE 4

1.2 g of soybean lecithin was added to 400 g of fish oil and stirred under nitrogen stream. After dissolving lecithin completely in the oil, 0.2 ml of 40% (w/w) ascorbic acid solution was added, and continuously stirred until the reverse micelles of the oil was formed. 10 g of each fish oil sample containing 200 ppm ascorbic acid was put into a Petri dish, 11.5 cm in diameter and 1 cm deep, and stored in a dark oven kept at 30° C.

Rosemary extract (product of McCormick Co., Japan: sp-10) and delta-tocopherol were added directly to the fish oil containing reverse-micelle solublized ascorbic acid at 0.2% (w/w) and 0.5% (w/w), respectively. 10 g of each of the fish oil containing 200 ppm ascorbic acid and 0.2% rosemary extract and the fish oil containing 200 ppm ascorbic acid and 0.5% delta-tocopherol were put into a Petri dish, 11.5 cm in diameter and 1 cm deep, and stored in a dark oven kept at 30° C.

During 42 days, the peroxide values were determined as an index of oxidation stability of the oils. The change of peroxide values with storage time is shown in FIG. 2. As shown in FIGS. 1 and 2, when ascorbic acid and rosemary extract or ascorbic acid and delta-tocopherol were added together, they exerted a synergistic effect in the oils tested.

What is claimed is:

1. A method for inhibiting oxidation of fats and oils, comprising:
    forming a single phase solution by admixing
    an oil selected from the vegetable oils, animal oils, edible oils or mixtures thereof;
    tocopherol as a fat-soluble anti-oxidant;
    ascorbic acid as a water-soluble anti-oxidant; and
    a sufficient amount of lecithin as a surfactant to form reverse micelles to maintain said water-soluble anti-oxidant within said oil as a single phase solution.

2. The method of claim 1 wherein said lecithin is present in an amount from about 0.1–0.5 weight percent with respect to said oil.

3. The method of claim 2 wherein said oil is selected from the group consisting of the edible oils and mixtures thereof.

4. A method of inhibiting oxidation of fats and oils, comprising:
    solubilizing a water-soluble anti-oxidant in an aqueous solution;
    solubilizing in a non-aqueous solution containing an oil selected from the fats, the oils and mixtures thereof, a fat-soluble anti-oxidant and a surfactant characterized by high solubility in fat, oil and water; and
    admixing said solutions to produce a single phase solution, said surfactant present in said single phase solution in an amount to form sufficient reverse micelles to maintain within said single phase solution said water-soluble anti-oxidant.

5. The method of claim 4 wherein said surfactant is present in an amount from about 0.1–0.5 weight percent with respect to said non-aqueous solution.

6. The method of claim 5 wherein the weight ratio of surfactant to water in said single phase solution is about 1 to about 0.05–0.5.

7. The method of claim 4 wherein said non-aqueous solution is selected from the group consisting of the vegetable oils, the animal oils, the edible oils and mixtures thereof.

8. The method of claim 7 wherein said non-aqueous solution is an edible oil.

9. The method of claim 4 wherein said surfactant is selected from the group consisting of the phospholipids, the monoglycerides, cetyltrimethyl-ammonium bromide, polyethylene glycol, the polyoxyethylene ethers of alcohols, octoxynol, the polyoxyethylene derivatives of fatty acid partial esters of sorbitol anhydrides, dioctyl sodium sulfosuccinate and mixtures thereof.

10. The method of claim 9 wherein said surfactant is selected from the group consisting of the phospholipids, the monoglycerides and mixtures thereof.

11. The method of claim 10 wherein said surfactant is a phospholipid.

12. The method of claim 11 wherein said surfactant is lecithin.

13. The method of claim 4 wherein said water-soluble anti-oxidant is selected from the group consisting of ascorbic acid, iso-ascorbic acid, chloro-iso-ascorbic acid, the extracts of spices, amino acids and organic acids.

14. The method of claim 13 wherein said water-soluble anti-oxidant is ascorbic acid.

15. The method of claim 13 wherein said water-soluble anti-oxidant is ascorbic acid and rosemary extract.

16. The method of claim 13 wherein said water-soluble anti-oxidant further includes an additive selected from the group consisting of ethylene diamine tetraacetic acid (EDTA), its sodium salts and mixtures thereof.

17. The method of claim 4 wherein said fat-soluble anti-oxidant is selected from the group consisting of tocopherol, butylated hydroxyanisole, butylated hydroxytoluene, propyl gallate and mixtures thereof.

18. The method of claim 17 wherein said fat-soluble anti-oxidant is tocopherol.

19. The method of claim 4 wherein said non-aqueous solution is an edible, said surfactant is lecithin, said water-soluble anti-oxidant is ascorbic acid and said fat-soluble anti-oxidant is tocopherol.

20. The method of claim 19 wherein said surfactant is present in an amount from about 0.1–0.5 weight percent with respect to said oil.

* * * * *